United States Patent Office 3,091,604
Patented May 28, 1963

3,091,604
METAL CHELATES OF VINYLIC COPOLYMERS CONTAINING A PLURALITY OF HYDROXY GROUPS
Herbert R. Lukens, Jr., El Cerrito, Calif., assignor to Shell Oil Company, a corporation of Delaware
No Drawing. Filed Dec. 22, 1958, Ser. No. 781,875
10 Claims. (Cl. 260—87.3)

This invention relates to novel chelate compounds and to methods for their preparation. More specifically, it relates to novel oil-soluble chelate compounds of metals, to their methods of preparation, and to compositions of matter containing such chelate compounds.

The term "chelate" was proposed by Morgan, J. Chem. Soc. 117, 1456 (1920), to designate cyclic structure arising from the union of metallic ions with organic or inorganic molecules or ions. Chelates, although merely a special class of coordination compounds, are characterized by their unusual stability. This stability has been extensively utilized in the commercial applications of such common chelating agents as ethylenediamine tetraacetic acid, which is sold under a variety of trade names, including "Versene," "Sequestrena," and "Nullapon." Moreover, the high solubility of some metal chelates in organic solvents has been used extensively in the separation of metallic ions by liquid-liquid extraction. Examples of such chelates are those derived from the agents cupferron (ammonium salt of N-nitrosophenyl hydroxylamine), dithizone (diphenyl thiocarbazone) and TTA (thenoyltrifluoroacetone). The use of such compounds is extensively described in the current literature by such texts as Morrison and Freiser, Solvent Extraction in Analytical Chemistry (John Wiley, 1957).

I have unexpectedly discovered that useful metal complexes can be prepared from a novel class of complexing agents, the oil-soluble copolymers of long-chain hydrocarbyl alpha-monoolefins with vinyl esters of lower alkyl carboxylic acids. It is therefore an object of this invention to provide such complexes as well as a method of making them. Another object of the invention is the provision of compositions of matter comprising hydrocarbon fluids, such as gasoline and oil, containing my chelate complexes, and particularly the stabilization of these liquids with the complexes. Still another object of the invention is a process whereby metals may be easily separated from aqueous solutions with the aid of my new complexes. Other objects will be apparent from the following description of the invention.

These objects and others are achieved by my novel metal compounds which comprise the chelates of an at least partially hydrolyzed copolymer of a lower molecular weight alkyl carboxylic acid and an acyclic alpha-monoolefinic hydrocarbon having from 10 to about 40 carbon atoms, said copolymer having an average molecular weight between about 300 and about 100,000, with a metal cation of an element other than an alkali metal. These metal cations are characterized by having valences in excess of 1.

The copolymeric chelating agent which forms the ligand, or basic coordinated component of the chelate, is a hydrolyzed reaction product of a vinyl ester of a lower molecular weight alkyl carboxylic acid, or a mixture of such esters, and an acyclic alpha-monoolefinic hydrocarbon containing a terminal vinyl, or $CH_2=CH-$, group, and containing at least 10 and no more than 42 carbon atoms, or a mixture of such alpha-olefins. The hydrolyzed reaction product is a mixture of compounds having an average molecular weight of from about 300 to about 100,000, each molecule thereof containing a linear "backbone" hydrocarbon chain of from about 10 to about 4000 carbon atoms substituted on about half the carbon atoms of this chain by randomly or uniformly located polar and non-polar groups, the polar groups being hydroxyl groups and alkanoyloxy

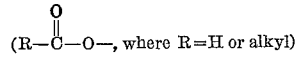
(R—C—O—, where R=H or alkyl)

groups, the alkyl subgroup of the latter containing no more than 4 carbon atoms, at least about 30% of the polar groups being hydroxyl groups, and the non-polar groups being acyclic hydrocarbyl groups containing from 8 to 40 carbon atoms, wherein the ratio of the number of polar groups to the number of non-polar groups is from about 0.5:1 to about 10:1.

The alkyl groups of the copolymer are, of course, determined by the particular acyclic alpha-monoolefin used. Since the terminal $CH_2=CH-$ group of this monomer enters the "backbone" chain of the copolymer, the alkyl group derived from a particular olefin molecule will be the remainder of the molecule. It is preferred that these alkyl groups be straight chain groups and it is also preferred that they contain at least 10 carbon atoms, especially at least 12 carbon atoms. However, these groups should not be too long and preferably should contain no more than 30 carbons. Still better results will be obtained with alkyl groups containing no more than about 20 carbon atoms.

Examples of suitable alpha-monoolefins include the normal alpha-olefins, such as decene, hendecene (undecene), dodecene, tridecene, tetradecene, pentadecene, hexadecene, heptadecene, octadecene, nonadecene, eicosene, heneicosene, docosene, tricosene, tetracosene, pentacosene, hexacosene, heptacosene, and so on through pentacontene, hexacontene, and heptacontene. Such olefinic materials can be obtained, for example, by cracking paraffin waxes by methods well known in the art.

The acid from which the vinyl ester is derived can generally be any of the lower molecular weight alkyl carboxylic acids, preferably monocarboxylic acids, containing up to 5 carbon atoms. The vinyl ester can thus be vinyl formate, vinyl acetate, vinyl propionate, or the like. Vinyl acetate is a cheap, readily available and especially preferable ester for the purposes of the invention.

It is preferred that the average molecular weight of the hydrolyzed copolymer be at least 400 and even better results will be generally obtained with molecular weights above about 1000. On the other hand, although molecular weights up to about 100,000 can be used, better results will be generally obtained with average molecular weights no greater than about 50,000 and especially no greater than 25,000.

Generally, superior results are obtained with hydrolyzed copolymers of the invention wherein the ratio of the number of polar groups to the number of non-polar groups (i.e., the mole ratio of the vinyl ester to the alpha-olefin in the copolymer before hydrolysis) is at least 1:1, especially at least 3:1. On the other hand, this ratio is preferably not greater than 8:1, and especially not greater than 5:1.

The degree of hydrolysis of the copolymer, of course, determines the proportion of the polar groups which will be hydroxyl groups. It is preferred that at least 50%, and especially at least 80%, of the polar groups be hydroxyl groups. Generally, best results will be obtained if nearly all are hydroxyl groups; however, practical considerations in the hydrolysis of the copolymer will usually limit the economic proportion of hydroxyl groups to about 90 or 95% of the total of the hydroxyl and alkanoyloxy groups of the hydrolyzed copolymer.

The copolymer can be readily prepared by reacting the vinyl ester with the alpha-olefin in the presence of a free radical catalyst or "initiator." Generally, an oxygen-containing catalyst is preferred, i.e., a compound containing two directly linked oxygen atoms, preferably an organic peroxide, for example, ditertiary butyl peroxide, benzoyl peroxide or dichlorobenzoyl peroxide, but other free radical catalysts, for example, alpha, alpha-azodiisobutyronitrile and the like, have been found to be effective. Also, the reaction can be made to progress by the use of actinic radiation, such as ultraviolet light. The concentration of the catalyst in the reaction mixture can be varied widely, for example, from as low as 0.01% weight to 5% weight or more, based on the weight of the reactants initially added. As a general rule, the larger the concentration of catalyst used, the lower will be the molecular weight of the resulting polymer.

The ratio of the two reactants or monomers, the vinyl ester and the alpha-olefin will, of course, depend upon the ratio of polar to non-polar groups desired in the copolymer product. Generally, the ratio of ester to olefin should be at least about 0.1:1 in order to provide a sufficient ratio of polar to non-polar groups in the copolymer. Best results are obtained if this ratio is at least about 0.1:1 and especially at least about 1.5:1. However, to avoid too high a ratio of polar to non-polar groups in the copolymer, this ratio should generally be not greater than about 10:1 and best results are obtained if this ratio is not greater than 5:1, especially not greater than 2.5:1. The amounts of excess monomer recovered after the polymerization reaction will, of course, indicate the ratio of the original monomers which have entered the copolymer. Accordingly, the ratio of the number of alkanoyloxy groups to the number of alkyl groups in the copolymer can be adjusted at will by varying the original ratio of the two monomers initially charged to the reaction.

Such copolymers, and their structure, preparation and hydrolysis, are more completely described in the patents to Lusebrink and Cosgrove, U.S. 2,800,401, issued July 23, 1957, and to Bondi and Scott, U.S. 2,800,453, issued on the same date.

The partially hydrolyzed copolymers so prepared are used extensively in the stabilization of fuel oils and gasolines, since they are readily compatible with hydrocarbon liquids and, when present in even small amounts, inhibit formation of sludge and sediment during storage of such materials. Furthermore, these polymeric materials prevent discoloration of the oils and gasolines during the storage period.

It has been observed, however, that the copolymers themselves are somewhat impermanent, for example, they are sometimes carried down in sludges. The apparent reason for this behavior is the reaction between the hydrolyzed copolymer and some component of the sludge. The net effect of this reaction is to remove the copolymer from solution in the hydrocarbon. I have found, however, that by complexing the partially hydrolyzed copolymer with metal cations other than those of alkali metals the stabilizing effect of the copolymer is not impaired and the stability of the resulting chelate compound is materially enhanced.

The metals whose cations form my novel complexes include those metals selected from groups IB, IIA and IIB, IIIA and IIIB, IVA and IVB, VA and VB, VIA and VIB, VIIB and VIII of the periodic table, and from the lanthanide and actinide series. Representative metals include such group IB metals as copper, silver and gold; such group II metals as the alkaline earths and zinc, cadmium and mercury; such group III metals as boron, aluminum and scandium; group IV metals including germanium, zirconium, tin and lead; group V metals such as vanadium and tantalum; group VI metals including chromium and molybdenum; group VII metals include manganese; and group VIII metals such as iron, cobalt and nickel; ruthenium, rhodium and palladium; and osmium, iridium and platinum. Other metals which chelate with the at least partially hydrolyzed copolymers described are the rare earth metals of the lanthanum series, including praseodymium, neodymium and the like. The actinide element metals, such as thorium, protactinium, uranium and plutonium also form chelates of the type described herein.

Cations of these metals are operative in my invention regardless of whether the nucleus of the metal atom is stable or radioactive. While the chelates of the stable metallic cations of such metals as iron, aluminum or lead have important industrial uses as stabilizers, anti-icing additives, and the like, chelates wherein the cation is radioactive are also useful. Such compounds may be used as "tracer" compounds wherein the radioactivity may be incorporated in oil-soluble form in the hydrocarbon liquid. By using such radioactive chelates in gasoline or fuel oil, the performance of such fuels may be examined by methods well known in radioisotope methodology. Examples of suitable radioisotopes that may be used in cation form in the preparation of the chelates are $Fe^{59}$, $Au^{198}$, and naturally occurring uranium isotopic mixture comprising $U^{238}$ and $U^{235}$.

A variety of methods may be employed for preparing my novel chelate compounds. One convenient method is to dissolve the at least partially hydrolyzed alpha-monoolefin-vinyl ester copolymer in a hydrocarbon solvent, such as benzene or toluene, and with the resulting solution mix a solution of an organic solvent miscible therewith containing the salt of the metal to be chelated. Upon washing the resulting mixture with water, it will be found that the metal cation remains in the organic phase. The resulting hydrocarbon-chelate solution may conveniently be added to gasoline or mineral oils for stabilizing or de-icing purposes. Alternatively, the solvents can be evaporated off and the dry complex taken up in any desired solvent therefor.

Another method for chelating the at least partially hydrolyzed copolymer is to extract the metal cation from aqueous solution with a water-immiscible organic solution of the copolymer. This method is useful not only for preparing the metal chelate but also because it provides a means of removing such cations from aqueous solutions. The extraction is performed by forming a liquid multiphase system wherein one phase is an organic water-immiscible solution containing the copolymer, and another phase is an aqueous phase comprising water containing a water-soluble salt of the metal to be complexed. While any water-soluble salt is satisfactory, I have found that halides and nitrates are to be preferred since they are both inexpensive and, in general, extremely water soluble. Thus, silver may be easily chelated by mixing a benzene solution of the copolymer with an aqueous solution of silver nitrate.

Furthermore, this method affords an efficient way of separating chelatable metal cations from solutions containing alkali metal cations such as lithium, sodium or potassium. Since the latter are not complexed with the partially or completely hydrolyzed alpha-monoolefin-vinyl ester copolymers, they will be left in aqueous solution while the complexed cations are removed into the organic phase containing the chelate. The chelated cations may be subsequently recovered by digesting the chelate with an oxidizing acid, such as nitric or sulfuric acid, or by ignition of the chelate to yield the metal oxide.

The chelates so prepared have a high degree of oil solubility and can be combined in a variety of proportions with various gasolines, oils, solvents and resins. They are superior as fuel oil additives since they are readily compatible therewith and when added even in small amounts act to inhibit formation of sludge and sediment during prolonged storage of the oils. In addition, these polymeric chelate products act to prevent discoloration of the oils during the storage period. Since the chelates are not leached or otherwise removed from the oils when exposed to water they are able to exert their anticlogging and color stabilization properties over a longer period than many of the commercial additives now being used.

The fuel oils in which the chelates are particularly useful are the hydrocarbon distillate fuel oils such as treated or untreated cracked fuel oils, or mixtures of cracked fuels, that is, thermally cracked and/or catalytically cracked, with straight run fuel oils, having components normally distilling at about 500° F. and having an end distillation point at around but not exceeding about 750° F. Such fuels generally have a boil range of from about 340° F. to about 700° F., and preferably have a boiling range of from about 400° F. to about 675° F. The chelates are employed in these oils in amounts sufficient to stabilize them, normally concentrations of from about 0.01% to about 2% by weight.

Similarly, the addition of the chelate compounds of my invention to lubricating oils in comparable amounts enhances not only the stability of the oil but also its detergency. Lubricating oils which may be used include those obtained from paraffinic, naphthenic, asphaltic or mixed base crudes, as well as mixtures thereof. Such oils may vary over a wide range of viscosity, such as from 50 SUS at 100° F. to 100 SUS at 210° F. The hydrocarbon lubricating oils may be blended with fixed oils such as castor oil, lard oil and the like, and/or with such synthetic lubricants as polymerized olefins; polyalkylene glycols such as copolymers of alkylene glycols and alkylene oxides; organic esters, especially the polyesters including 2-ethylhexyl sebacate, dioctyl phthalate and trioctyl phosphate; polymeric tetrahydrofuran; polyalkyl polysiloxanes (silicones), e.g., dimethyl silicone polymer, and the like.

The chelates are also useful as a means of introducing metals into gasolines, since they are readily soluble in gasolines and do not impair gasoline performance. For example, the chelate prepared by complexing lead with an at least partially hydrolyzed copolymer of an alpha-monoolefin with a vinyl ester, may be used both as a gasoline stabilizer and ice inhibitor and as a lead carrier. Other metals such as cobalt and manganese may also be introduced into gasoline in the form of my novel chelates.

That the metal copolymer complexes of my invention are truly chelates is shown by their properties. For example, the colors of the complexes differ from those of the metal alone, and water-washing of organic solutions containing the complex will not produce in the water the characteristic color of the aqueous ion. While an aqueous solution of cobaltous chloride is pink, the color of a toluene solution of the chelate of cobaltous ion and the partially hydrolyzed copolymer described above is blue. Washing of the toluene solution with water does not diminish the intensity of the blue toluene solution and introduce into the water any pink color. The color difference is observed in cupric ions which in aqueous solution are blue but in chelate form are green. Washing of the green chelate toluene solution with water does not extract detectable cupric ion into the aqueous phase.

Such washings also demonstrate the stability of my novel metal chelates, another characteristic of chelates in general. A third characteristic of chelates, their ability to reverse the solubility of metal ions in polar and non-polar solvents, is also shown by such experiments. For example, when an aqueous solution of ferric nitrate is stirred with toluene, only $5 \times 10^{-4}$ mg. of the iron is dissolved per ml. of toluene. The ferric ion chelate produced by the method of my invention, however, is insoluble in water but soluble in toluene to the extent of 0.3 mg. ferric ion per ml. of toluene. Similarly, when a toluene solution of a chelate prepared from radioactive gold was maintained in contact with a water solution of non-radioactive gold chloride, no exchange of gold ions had taken place at the end of seven days.

To illustrate the nature, preparation and utility of the chelates of my invention, the following examples are given. It is to be understood, however, that the examples are for the purpose of illustration only, and the invention is not to be regarded as limited to the specific materials and proportions set forth therein. Unless otherwise specified, parts disclosed in the examples are parts by weight.

*Example I.—Preparation of Iron Chelate*

To a 100-ml. flask were added 149.6 mg. of ferric nitrate $(Fe(NO_3)_3 \cdot 9H_2O)$ and 25 microliters of an $Fe^{59}$ tracer solution containing 30,000 d.p.m./microliter. To the resulting mixture was added 5 ml. of a toluene solution containing 250 mg. of an 80% hydrolyzed copolymer of vinyl acetate and a mixture of straight-chain $C_{13}$–$C_{18}$ alpha-olefins, the copolymer having a molecular weight of about 470, 15 ml. of toluene, and about 10 ml. of isopropanol. The mixture was evaporated to dryness on a heating mantle, and the residue taken up by refluxing it in toluene.

Radiometric and gravimetric analyses of the resulting toluene solution showed that about 6 mg. of iron per 100 mg. of copolymer were present in the toluene solution. A 5-ml. sample of the toluene solution was stirred vigorously for an hour with an equal volume of water. At the end of that time, the aqueous and organic phases were separated. Radio-assay of each phase showed that no iron activity had transferred from the organic to the aqueous phase.

Similar results were obtained when chelates were prepared from ferric chloride.

A sample of the iron chelate produced above was heated at 250° C. under vacuum for 30 minutes, and then cooled, weighed, and taken up in toluene. None of the chelate volatilized during heating, and over 60% remained toluene-soluble.

*Example II—Preparation of Zirconium Chelate*

To a 100-ml. flask were charged 285.0 mg. of zirconyl chloride $(ZrOCl_2 \cdot 8H_2O)$, 10 ml. of isopropanol, 300 microliters of a $Zr^{95}$ solution containing 10 d.p.m./microliter, 5 ml. of a toluene solution containing 5% by weight of the vinyl acetate-alpha-olefin copolymer of Example I, and 15 ml. of toluene. The mixture was allowed to stand for about 15 hours, and then evaporated to dryness with a heating mantle. The residue was taken up by refluxing in about 40 ml. of toluene for one hour.

Gravimetric and radiometric assay of the resulting toluene solution showed that the zirconium had been chelated by the copolymer in the proportion of about one mole of zirconium per two moles of copolymer.

*Example III—Preparation of Niobium Chelate*

To a flask as in the previous examples were added 92.2 mg. of niobium chloride, $NbCl_5$, 5 ml. of a toluene solution containing 5% by weight of the copolymer described in Example I, and 15 ml. of isopropanol. The mixture was evaporated to dryness, and the residue taken up in toluene.

An aliquot of the resulting toluene solution was irradiated with thermal neutrons to produce the radioactive Nb isotope. Radioassay of the resulting solution showed the amount of niobium chelated was about one mole of niobium per forty moles of copolymer.

*Example IV—Noble Metal Chelates*

Using aqua regia, samples of gold and silver metal were separately dissolved. The acid solutions were evaporated to dryness and the residues dissolved in a few drops of 6 N hydrochloric acid. To each of the resulting acid solutions were added isopropanol and portions of the toluene 5% copolymer solution previously described, and the mixture was evaporated to dryness. The resulting residues were taken up in toluene, and aliquots of the toluene solution irradiated with thermal neutrons. Radio-assay of these solutions gave the following results:

| Metal | Starting Amount, mg. | Mole Ratio, Metal/Copolymer |
|---|---|---|
| Au | 5 | 1:2 |
| Ag | 126.4 | 2:1 |

*Example V.—Extraction of Gold from Aqueous Solution*

(A) To 2 ml. of water was added 57 mg. of gold as auric chloride. This solution was stirred for one hour at room temperature with 2 ml. of toluene containing 5% by weight of the vinyl acetate-olefin copolymer described in previous examples. At the end of that time the phases were separated by centrifugation, and exposed to thermal neutrons to activate the gold.

(B) To 6 ml. of an aqueous solution containing 3.6% by weight of sodium chloride was added 2.4 mg. of gold as auric chloride, and the resulting solution was stirred for 90 minutes with 2 ml. of the 5% copolymer toluene solution. The phases were separated by centrifugation and irradiated with thermal neutrons. Radioasassay of the toluene phases gave the following data:

| Toluene Phase | Gold Content, mg. | Percent Extracted |
|---|---|---|
| (A) | 8 | 14.0 |
| (B) | 0.4 | 16.6 |

No sodium or chlorine activity was detected in the toluene phase of the second experiment, showing that neither sodium atoms nor sodium chloride were extracted.

In another experiment to the second experiment (B), but employing only 8 micrograms of gold in 8 ml. of 3.6% aqueous sodium chloride solution, stirring for 6 hours at room temperature with 3 ml. of a toluene solution containing 25 mg./ml. of the vinyl acetate-olefin copolymer resulted in the extracting of 3.8 micrograms, or 48%, of the gold into the toluene phase, as determined by neutron activation.

*Example VI.—Preparation of Cobalt Chelate*

A mixture containing 1.057 mg. of cobaltous chloride ($CoCl_2 \cdot 6H_2O$) and 250 microliters of a $Co^{60}$ solution containing 1.46 micrograms/ml. of cobalt was evaporated to dryness with a few drops of 6 N HCl, and the residue taken up with isopropanol. To the resulting solution was added one ml. of toluene containing 5% by weight of a partially hydrolyzed vinyl acetate-alpha-olefin copolymer having a molecular weight of 12,300 and an average of 3½ OH⁻ groups per molecule. The mixture was evaporated to dryness, and taken up in toluene. Radioassay of the resulting solution showed that one mole of cobalt per 2.5 moles of copolymer had been complexed.

*Example VII.—Chelation of Uranium*

A sample of uranyl nitrate, $UO_2(NO_3)_3 \cdot 6H_2O$, weighing 229.4 mg. was dissolved in an excess of isopropanol, and the solution was mixed with 3 ml. of toluene solution containing 5% by weight of a partially hydrolyzed vinyl acetate-alpha-olefin copolymer having a molecular weigh of about 15,000. The mixture was evaporated to dryness and the residue taken up in toluene. An aliquot of the resulting solution was irradiated with thermal neutrons and then radioassayed. Counting results from the irradiated sample showed that about 1.2 moles of uranium were taken up per mole of copolymer.

Uranium chelate was also prepared by stirring for 4 hours 7 ml. of an aqueous solution containing 7 mg. of uranium as uranyl nitrate with 3 ml. of the toluene solution containing 5% copolymer by weight. Neutron irradiation and counting of the resulting toluene solution showed that 0.77 mg., or 11%, had been extracted into the toluene by chelation.

*Example VIII.—Filterability of Metal Chelate Compositions*

The resistance to sludge formation and consequent screen clogging of fuel oils containing metal chelates was determined by comparing the filtering characteristics of fuel oil compositions containing the chelated copolymer with those of fuel oil compositions containing the unchelated copolymer, and fuel oil containing no added material. In the test, water was introduced into samples of No. 2 distillate fuel oil by low speed stirring of 100 ml. of the fuel oil with 5 ml. of water in a Waring Blendor.

Three types of samples of fuel oil were employed. The first contained 40 p.p.m. of the iron chelate, prepared as in Example I. The second contained 40 p.p.m. of unchelated copolymer, and the third contained no additive at all.

Each of the types of sample was pumped through a 0.9 cm. diameter filter at the rate of 14 ml./minute, and the time and pressure increase recorded for each run. The filter employed consisted of two layers of 10 micron paper, similar to that used in aircraft main line filters. The maximum pressure increase developed in each test was a measure of the filter clogging tendency of the fuel. The test procedure and equipment employed were those specified by Emeryville Method Series 14D1/58, as employed in the petroleum industry.

The maximum pressure developed by the samples containing the iron chelates and samples containing the unchelated copolymer was 8 mm. of mercury, while the fuel oil samples containing no additive had a maximum pressure of 24 mm. of mercury.

Similar results are obtained by using copolymers chelated with other metals, e.g., chromium and manganese. Similarly, the use of such chelates in a motor gasoline having a 50% ASTM boiling point of 200° F. produces a similar enhancement of filterability.

I claim as my invention:

1. The complex consisting of
   (a) a ligand, consisting of an at least 50% hydrolyzed copolymer of a vinyl ester of a lower molecular weight alkyl carboxylic acid, and an acyclic alpha-monoolefinic hydrocarbon having from 10 to 40 carbon atoms, the ratio of ester to hydrocarbon being from 1:1 to 8:1, and said copolymer having an average molecular weight between about 400 and about 100,000; and
   (b) the cation of a metal, said metal being selected from the group consisting of Groups IB, IIA, IIB, IIIA, IIIB, IVA, IVB, VA, VB, VIA, VIB, VIIB and VIII of the Mendeleef Periodic Table, and the lanthanide and actinide series.

2. The complex of claim 1 wherein the metal is a Group VIII metal.

3. The complex of claim 1 wherein the metal is a Group IB metal.

4. The complex of claim 1 wherein the metal is an actinide.

5. The complex of claim 1 wherein the metal is radioactive.

6. The complex of claim 1 wherein the metal is iron.

7. The complex of claim 1 wherein the metal is calcium.

8. The method for complexing the cation of a metal which comprises
   (a) forming a liquid multiphase system comprising
      (1) an organic water-immiscible phase containing an at least 50% hydrolyzed copolymer of a vinyl ester of a lower molecular weight alkyl carboxylic acid and an acyclic alpha-monoolefinic hydrocarbon having from 10 to 40 carbon atoms, the ratio of ester to hydrocarbon being from 1:1 to 8:1, said copolymer having an average molecular weight between about 400 and 100,000, and (2) an aqueous phase comprising water and a water-soluble metal salt wherein the metal cation is selected from the group consisting of Groups IB, IIA, IIB, IIIA, IIIB, IVA, IVB, VA, VB, VIA, VIB, VIIB, and VIII of the Mendeleef Periodic Table and the lanthanide and actinide series, and (b) extracting the cation of metal from the aqueous into the non-aqueous phase to form a complex of the copolymer and the cation.

9. The method of claim 8 wherein the salt is a halide.
10. The method of claim 8 wherein the salt is a nitrate.

References Cited in the file of this patent

UNITED STATES PATENTS

| | | |
|---|---|---|
| 2,399,653 | Roland | May 7, 1946 |
| 2,421,971 | Sperati | June 10, 1947 |
| 2,455,936 | Lowe | Dec. 14, 1948 |
| 2,659,711 | Wilkins et al. | Nov. 17, 1953 |
| 2,800,401 | Lusebrink et al. | July 23, 1957 |
| 2,800,452 | Bondi et al. | July 23, 1957 |
| 2,800,453 | Bondi et al. | July 23, 1957 |
| 2,854,441 | Mendelsohn | Sept. 30, 1958 |
| 2,913,439 | Bondi et al. | Nov. 17, 1959 |
| 2,933,475 | Hoover et al. | Apr. 19, 1960 |
| 2,952,636 | Groot et al. | Sept. 13, 1960 |